United States Patent [19]

Griset

[11] Patent Number: 4,499,667
[45] Date of Patent: Feb. 19, 1985

[54] GUIDE CLAMP

[76] Inventor: Norman Griset, 380 Jennifer La., Orange, Calif. 92669

[21] Appl. No.: 515,174

[22] Filed: Jul. 19, 1983

Related U.S. Application Data

[63] Continuation-in-part of Ser. No. 326,840, Dec. 3, 1981, Pat. No. 4,394,800.

[51] Int. Cl.³ .................. A47B 27/00; B43C 5/00
[52] U.S. Cl. ................................ 33/446; 33/437
[58] Field of Search ............... 33/443, 430, 437, 434, 33/445, 448, 32 C, 32 R, 42, 446; 269/42, 43, 66, 140, 142, 166, 167, 170, 196, 204, 217, 229, 231, 236

[56] References Cited

U.S. PATENT DOCUMENTS

| | | | |
|---|---|---|---|
| 1,890,042 | 12/1932 | Morandi | 269/236 |
| 2,002,676 | 5/1935 | Owens | 33/446 |
| 2,085,304 | 6/1937 | Farrell | 33/446 |
| 2,326,301 | 8/1943 | Leffel | 33/446 |
| 2,501,296 | 3/1950 | Tyler | 33/430 |
| 2,592,076 | 4/1952 | Spinnler | 269/166 |

Primary Examiner—Willis Little
Attorney, Agent, or Firm—Cantor and Lessler

[57] ABSTRACT

A guide clamp is disclosed which includes a clamping jaw at one end of a guide bar. An opposing shifting jaw is slidably carried on the guide bar to permit a workpiece to be embraced by the jaws. The guide bar is a flat, rectangular channel member open at the undersurface which engages the workpiece surface. The jaws, extended below this undersurface engage the opposite sides of the workpiece, such as a board, with the shifting jaw being shiftable and lockable in the channel at a jaw-engaging position and with the clamp jaw being shiftable in the channel a short distance by lever action to lock the clamp onto the workpiece. When so mounted and locked upon a workpiece, the guide clamp may be used as a clamp, a marker guide or a tool guide. Suitable guideways to guide and hold tools, jegs and the like may be provided on the guide bar.

20 Claims, 15 Drawing Figures

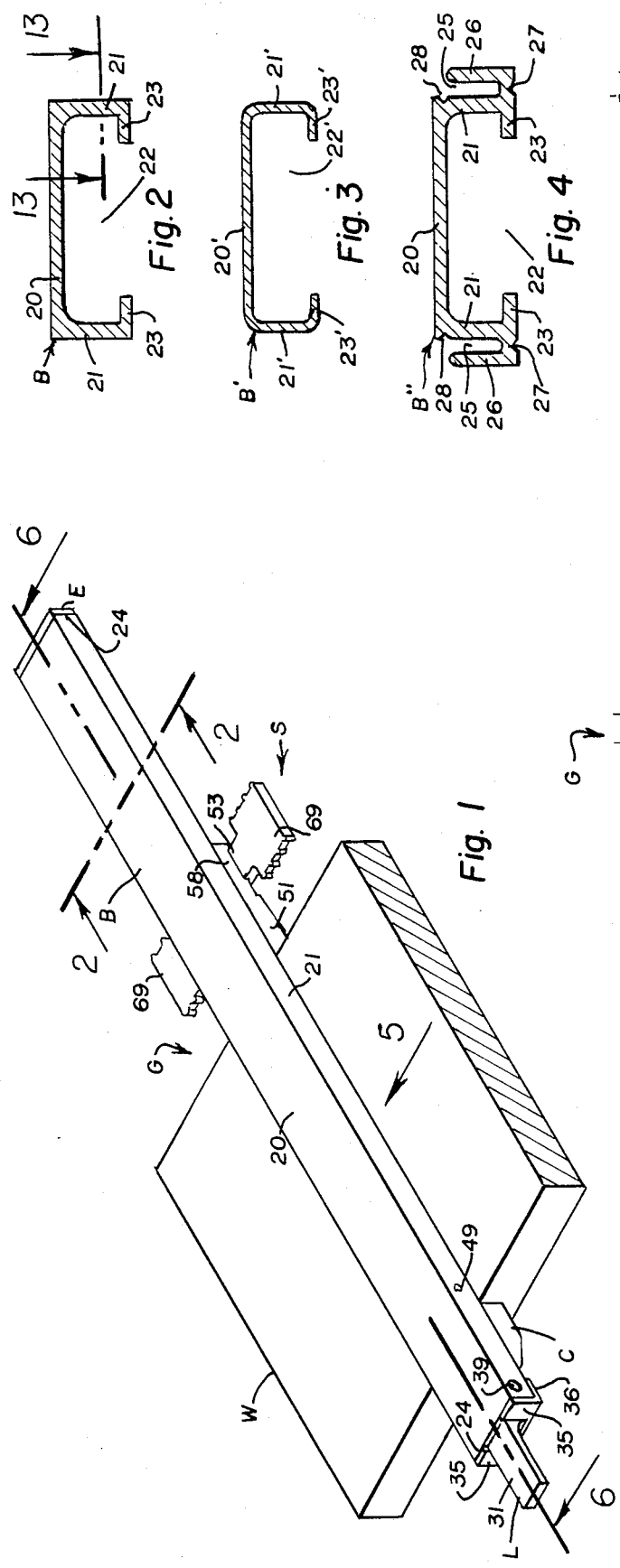

GUIDE CLAMP

CROSS-REFERENCE TO RELATED APPLICATION

This is a continuation-in-part of my copending application Ser. No. 326,840, filed Dec. 3, 1981, now U.S. Pat. No. 4,394,800.

BACKGROUND OF THE INVENTION

The present invention relates to tool guiding and marking devices and more particularly to guides and markers which are clamped to a workpiece. As such, the invention will be hereinafter called a "guide clamp," functioning both as a guide and a clamp.

The present invention is a development from and an improvement over the "guide clamp" disclosed in my application, Ser. No. 326,840, filed Dec. 3, 1981, and which has matured into U.S. Pat. No. 4,394,800, dated July 26, 1983, and which is embodied herein in its entirety by reference. The prior guide clamp and the guide clamp disclosed herein are similar in appearance and may be used in a similar manner. However, their internal features differ in significant aspects to attain a more simple, economical and versatile structure in a guide clamp as herein disclosed.

Guide clamps are not new and the patent to William J. Fortune, U.S. Pat. No. 3,287,808, is exemplary of the prior art. The basic features of a guide clamp include a guide bar having a pair of gripping jaws outstanding from one edge of the bar to clamp onto a workpiece such as a board. One jaw, the clamping jaw, is at one end of the bar. The other jaw, the shifting jaw, may be positioned along the reach of the bar to bring the jaws against the edges of the workpiece and the clamping jaw will then secure the guide clamp onto the workpiece. The guide clamp may be used for various purposes such as for clamping parts together, marking or providing an abutment for a power hand saw which is held against the guide clamp as it makes a cut across the workpiece.

SUMMARY OF THE INVENTION

The present invention combines these basic features into a neatly arranged, compact unit wherein the components of the clamping jaw and the shifting jaw which connect with the bar are carried within a channel-shaped bar completely out of the way and with only the jaw face abutments and finger gripping wings at the shifting jaw projecting below the bar.

It follows that the objects of the invention are to provide a novel and improved guide clamp which: (a) can be used to hold and guide power hand tools in proper positions and in precise alignment as they are moved across a workpiece; (b) can be used to hold attachments and special tools for precision woodworking operations; (c) can be quickly and easily mounted upon a workpiece and secured thereto by simply pushing a lever; (d) can be attached to a workpiece with no portion of the jaws or other parts of the clamp projecting below the workpiece to permit the workpiece to lie flat upon a table with the guide clamp in place; (e) has an adjustable shifting jaw which is easily moved along the reach of the reach of the guide bar and locked in place on the guide bar at any selected position; (f) provides for an improved and simplified locking mechanism on the shifting jaw which is completely within the embrace of a channel shaped bar in an out-of-the-way position; (g) is a lightweight unit useful as a clamp, guide and a base whereon other tools may be affixed; and (h) may be manufactured at low cost from extruded and molded low-cost materials as a neat-appearing, economical, rugged and durable unit.

BRIEF DESCRIPTION OF THE DRAWINGS

With the foregoing and other objects in view, my invention comprises certain constructions, combinations and arrangements of parts and elements as hereinafter described, defined in the appended claims and illustrated, in preferred embodiments, in the accompanying drawings, in which:

FIG. 1 is an isometric view of the improved guide clamp mounted upon a board or a workpiece, for clamping or marking;

FIG. 2 is a transverse sectional elevational view of the guide clamp bar as taken from the indicated line 2—2 at FIG. 1 but on an enlarged scale;

FIG. 3 is a sectional view similar to FIG. 2 but showing an alternate construction of the bar;

FIG. 4 is a sectional view similar to FIG. 2 but showing another alternate construction of the bar;

FIG. 5 is a side elevational view of the guide clamp as taken from the indicated arrow 5 at FIG. 1 but on an enlarged scale and with portion broken away to conserve space;

FIG. 6 is a longitudinal sectional elevational view as taken from the indicated line 6—6 at FIG. 1 but on an enlarged scale and with portions broken away to conserve space;

FIGS. 14 and 15 are fragmentary sectional details of a portion of an alternate construction of parts of the shifting jaw mounted on the guide clamp bar and wherein FIG. 14 is viewed from the indicated line 14—14 at FIG. 15 and FIG. 15 is viewed from the indicated line 15—15 at FIG. 14.

DESCRIPTION OF THE PREFERRED EMBODIMENTS

Figure 8:
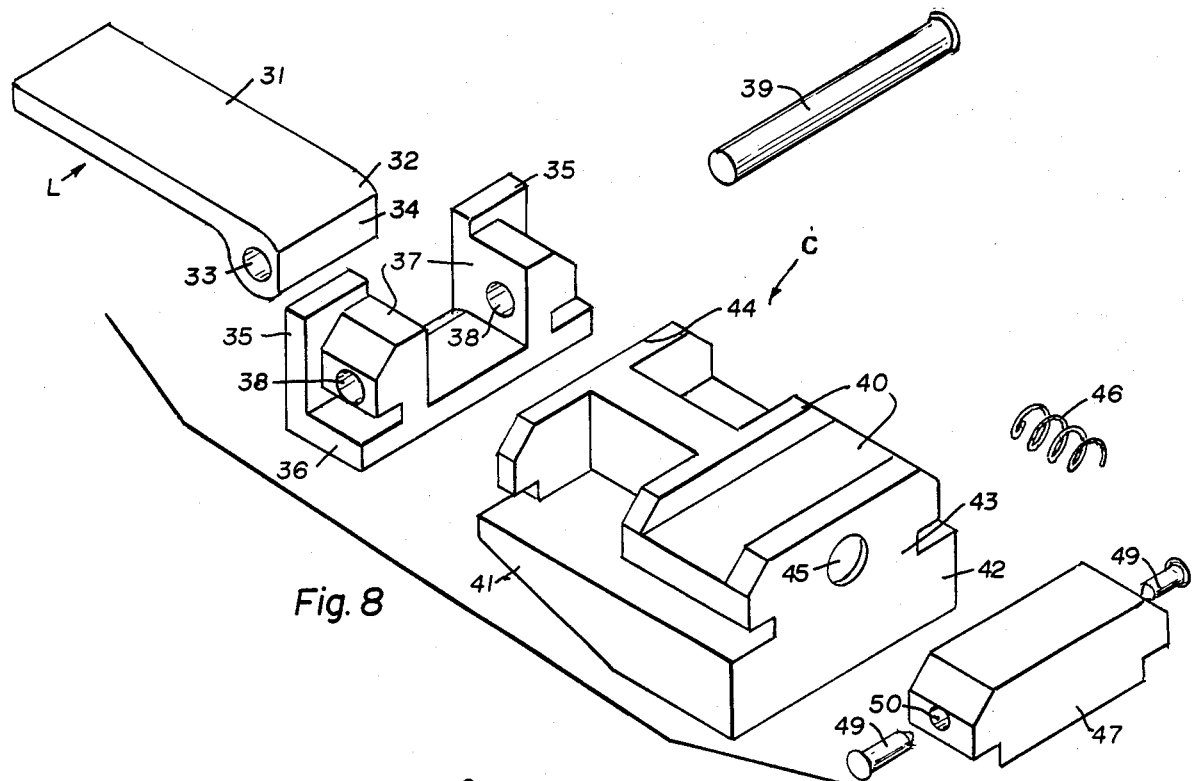
FIG. 8 is an isometric exploded view of the clamp jaw components shown at FIG. 7.

Referring more particularly to the drawing, the improved guide clamp G includes a straight, elongate bar B. A clamp jaw C is affixed to the head end of the bar and an opposing shifting jaw S is movable along the reach of the bar. An end cap E may be affixed to the rearward end of the bar. The clamp and shifting jaws S and C depend from the underside of the bar B to grip the opposite edges of a workpiece W such as a board. The jaws are spaced for gripping the workpiece by moving the shifting jaw S along the bar and the guide clamp G is then locked upon the workpiece W by depressing a lever L outstanding from the clamp jaw as illustrated at FIG. 6. It is to be noted that this guide clamp G may be of any length necessary to accommodate and fit upon any flat workpiece with which it will be used.

The bar B, illustrated in section at FIG. 2, is channel shaped with a top surface 20 constituting the web portion of the channel and with legs 21 depending from the edges of the top surface 20 constituting the flange portions of the channel. The cavity 22 between these legs 21 is constricted at its lower opening by an inturned lip 23 at the bottom of each leg. The upper portions of the clamp jaw C and the shifting jaw S and the end cap E fit into this cavity 22 as hereinafter described. This channel shaped bar B is a symmetrical unit to provide a neat appearance, and is manufactured as an extrusion of a high-strength aluminum alloy or similar metal of sufficient strength for the purpose at hand. The extrusion may be cut to selected lengths for economical manufacture of the bars so the only machining operations necessary will be squaring the ends 24 to better fit with the clamp jaw C and end cap E.

The bar B', illustrated in section at FIG. 3, has the same features as the bar B. The bar is channel shaped with a top surface 20', legs 21' to form a cavity 22' and with a constricted lower opening formed by inturned lips 23'. However, this bar B' is manufactured by bending and forming sheet metal such as steel plate. Such forming operations are conventional and need not be described. The purpose of such a construction is to reduce the cost of manufacture and provide a stronger and stiffer bar.

The Bar" is essentially the same as bar B and is also manufactured from an extrusion of selected metal. The top surface 20, the legs 21, the cavity 22 and the inturned lips 23 are the same as heretofore described. However, a slide slot 25 is provided alongside one or both legs 21 by a flange 26 upstanding from an outwardly projecting shoulder 27. Also, to hold a fixed attachment on the bar, a notched guideway 28 is located at the outer face of a leg near its top edge above the flange 25. The attachments used with this bar B" are described in my aforementioned copending application, Ser. No. 326,840, and need not be further described.

Figure 7:
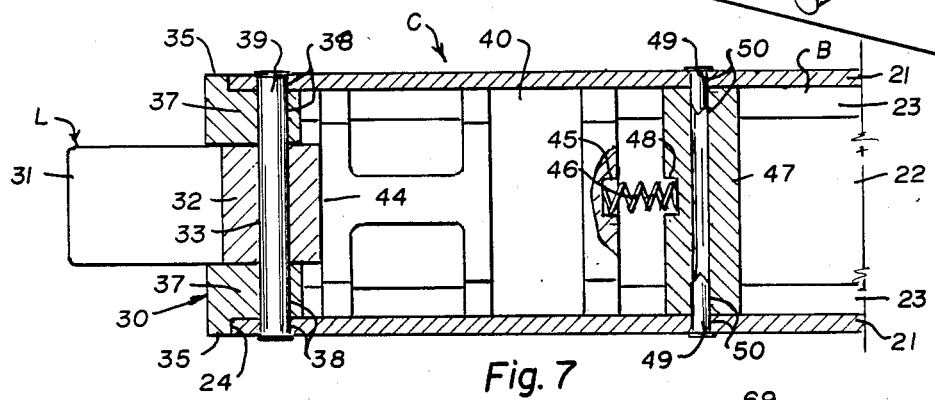
FIG. 7 is a sectional plan view as taken from the indicated line 7—7 at FIG. 6 showing the components forming the clamp jaw.

The clamp jaw C, shown at FIGS. 6, 7 and 8, is actuated by the lever L mounted in a block 30 at the end of the bar B. The lever L is formed as a flat arm 31 having an enlarged, cylindrical cam head 32 which fits in a socket in the block 30 and within the bar cavity 22. The cam head 32 has a passageway 33 through it and a flat face 34 normal to the surface of the arm 31. The block 30 is formed with spaced wall portions 35 which abut against the bar end 24. The wall portions 35 upstand from a floor section 36 at the undersurface of the bar. Spaced lugs 37, which snugly fit into the bar cavity 22, join with the wall portions 35 and floor 36. The cam head 32 is fitted between the lugs 37 and passageways 38 through the lugs 37 and through the legs 21 of the bar B register with the cam head passageway 33 to receive a pintle pin 39. The assembly is thus held in place and when the lever L is in the up position, as shown at FIG. 5, the end of the clamp jaw C abuts against the flat face 34 and against the block 30, but, when the lever L is depressed, as shown at FIG. 6, the cam head rotates to shift the clamp jaw C towards a workpiece to lock it into place.

The clamp jaw C is a comparatively stubby member having an upper support block 40 shaped to slidably fit in the bar cavity 22 and an abutment 41 below the block 40 which includes the jaw face 42. A neck 43 separates the support block 40 and the abutment 41 to receive the inturned lips 23 of the bar legs 21. An abutment wall 44 opposite the jaw face 42 is extended to the support block 40 to engage the lever head 32. The jaw face 42 is also extended to the support block 40 to carry a socket 45 where a reaction spring is mounted as will be described.

The clamp jaw C may be formed as a skeletal structure with pocket-like cavities in both the support block 40 and the abutment 41 in any suitable pattern such as illustrated. This cavity pattern saves material and facilitates forming a dimensionally stable component, especially when the clamp jaw C is molded from a selected, strong plastic material such as nylon. It is to be noted that nylon is one preferred material for the manufacture of the clamp jaw C, the lever L, the sliding jaw S and the end cap E, all with conventional injection molding operations.

When securing a workpiece in the guide clamp by depressing the lever L, the clamp jaw C moves towards and against the workpiece a short distance 'd' as shown at FIG. 6. To release the guide clamp C from the workpiece W it is merely necessary to lift the lever L and in doing so the clamp jaw C is free to move back to its initial position, as against the block 30 as shown at FIG. 5. This movement is automatically accomplished by a reaction spring 46 which is mounted between the jaw face 42 and a holding block 47 fitted into the bar cavity 22 a short distance from the jaw face 42. The holding block 47 is provided with a socket 48 opposite to the jaw face socket 45 and the ends of the spring 46 are fitted into these sockets to hold it into place. The holding block 47 is secured in position in the cavity 22 by pins 49 driven into matching holes 50 through the block and in the legs 21 of the bar B, as shown in FIG. 7. The bias of the spring 46 keeps the clamp jaw C against the cam head 32 of the lever L at all times.

The shifting jaw S combines a jaw block 51, lock clips 52 and a release carrier 53 as shown at FIGS. 6, 9, 10, 11, and 12. The jaw block includes an H-shaped structure in the bar cavity 22 above the inturned lips 23 with a head wall 54 at the forward side of the jaw block 51, that is, the side facing the clamp jaw C. A transverse rear wall 55 at the opposite side of the jaw block 51 and a longitudinally disposed central wall 56 between the head and rear walls completes the H-form. A floor 57 between the bar lips 23 connects with the lower edges of the walls 54, 55 and 56 to form two side-by-side compartments in the bar cavity 22. A pair of spaced, opposing T-shaped guides 58 merge with, and extend below and rearwardly from the floor 57 to be embraced by the inner faces and under sides of the inturned lips 23 and provide opposing parallel guidewalls between which the release carrier is mounted as hereinafter described. A transverse abutment 59 is positioned below the forward end of the floor 57, and below the head wall 54, with its forward side forming the jaw face 60. The forward portions of the guides 58, below the floor 57, are widened to extend downwardly to merge with the abutment 59. The rearwardly extended portions of the guides 58 have undersurfaces 61 which are parallel with the inturned lips 23 thereabove to permit the guides to slide in a groove in the release carrier.

Figure 9:
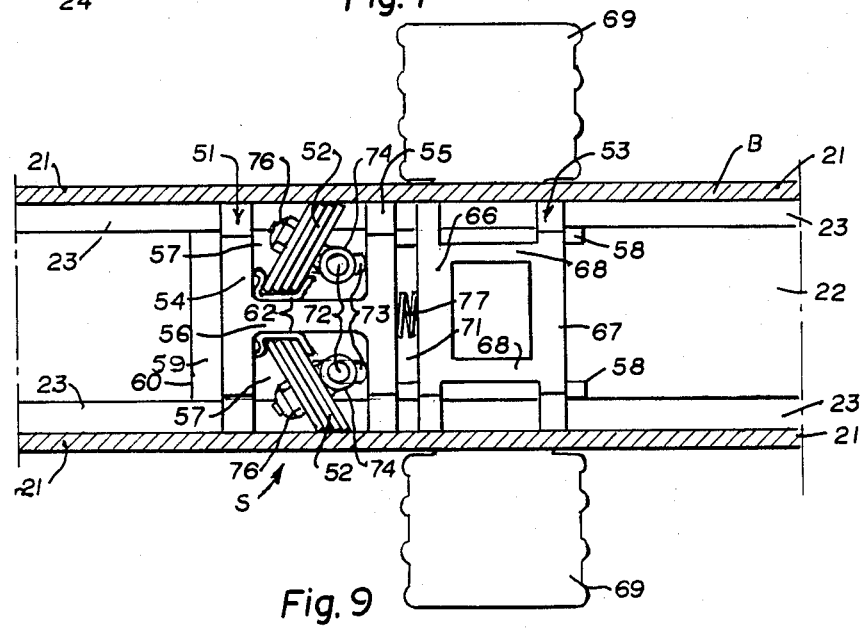
FIG. 9 is a sectional plan view as taken from the indicated line 9—9 at FIG. 6, showing the components forming the shifting jaw.
Figure 10:
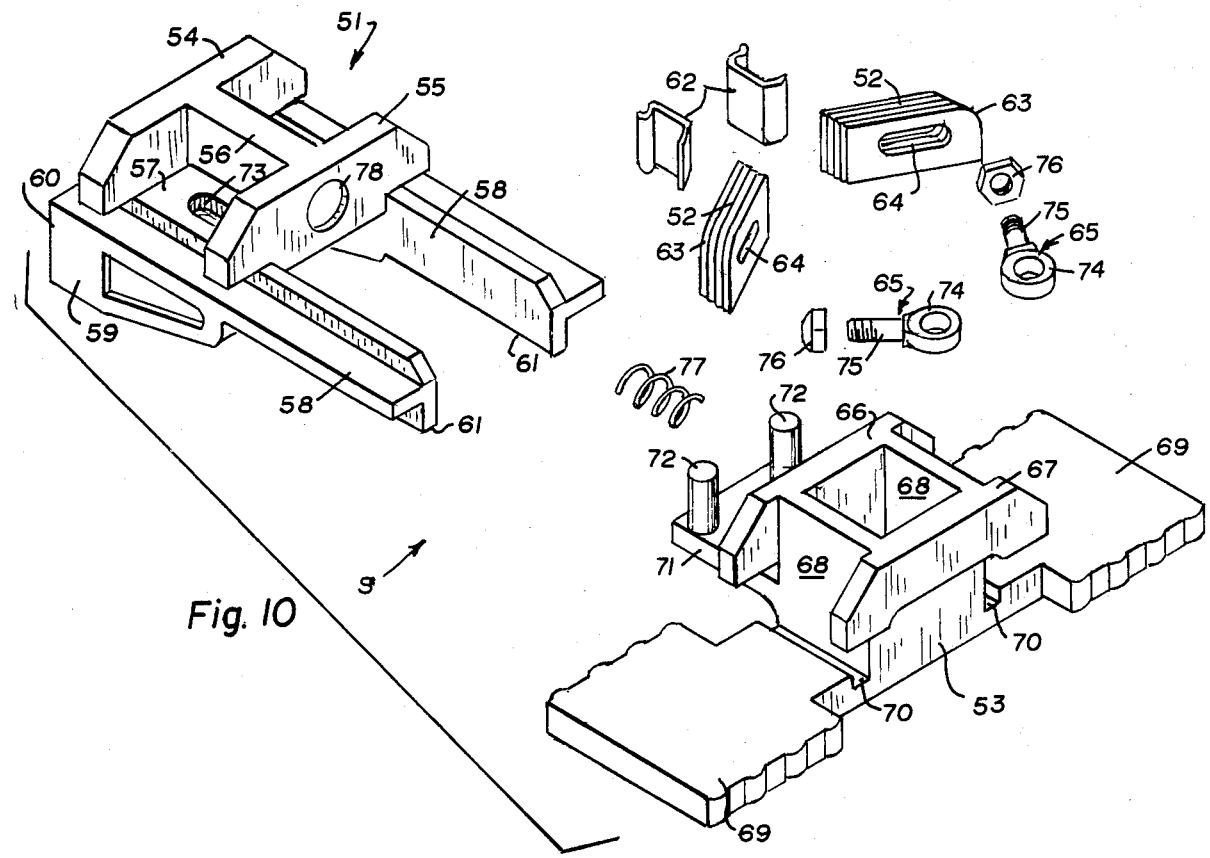
FIG. 10 is an isometric exploded view of the shifting jaw components shown at FIG. 9.
Figures 11, 12:
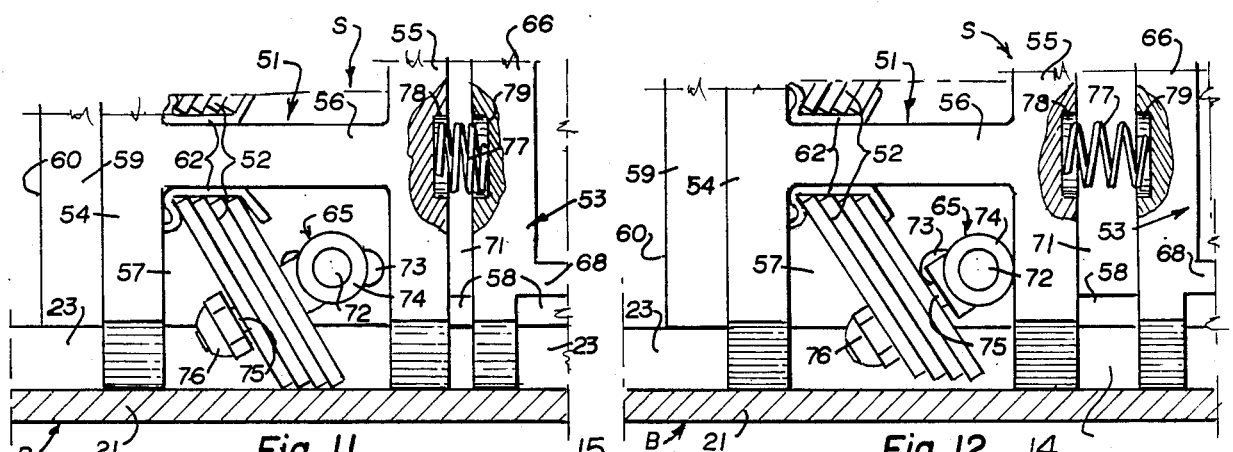
FIG. 11 is a fragmentary portion of the shifting jaw components as shown at FIG. 9 but on an enlarged scale and illustrating the same as being locked to the guide clamp bar as for clamping to a workpiece.
FIG. 12 is a fragmentary portion of the shifting jaw components, similar to the showing at FIG. 11, but illustrating the same as being unlocked from the guide clamp bar for free shifting of the shifting jaw on the guide clamp bar.

The lock clips 52 are flat rectangular plates of hard metal, with squared, sharp edges to grip the inner walls of the bar legs 21 and thereby lock the shifting jaw to the bar. A set or nest of three or four lock clips 52 is mounted in each side compartment formed by the walls 54, 55 and 56 above the floor 57. The inward end of each nest of clips 52 is carried on a pad 62 located at the corner formed by the central wall 56 and the forward head wall 54. Thence, the nest of clips extends outwardly and rearwardly therefrom at a suitable angle to reach to and engage the inner wall surface of the adjacent bar leg 21, as shown at FIGS. 9 and 11. When so engaged, with the opposing nests of lock clips 52 pushing against the wall 56 and against the opposing bar legs 21, the shifting jaw is tightly locked to the bar. The lock clips 52 may have an outer corner rounded as at 63, FIG. 10, to better fit the fillet formed at the corner between the under surface of top 20 and the inner surface of the leg 21 shown at FIG. 2. To complete the lock clips, a central slot 64 is provided in each lock clip 52 to receive a pull bolt 65 as hereinafter further described.

The outer end of each nest of clips 52 is adapted to shift rearwardly to move the clips out of engagement with the bar legs 21 and to the position shown at FIG. 12. So positioned the shifting jaw S may be moved back and forth along the bar B. The nests of lock clips 52 are normally, and resiliently, held in this disengaged position by the release carrier 53. The release carrier is shaped as a rectangular post topped by a forward transverse head 66 and a rearward transverse head 67. The heads are proportional to fit in the bar cavity 22 above the inturned lips 23. The sidewalls 68 of this post-shaped carrier lie between the guides 58 as heretofore mentioned. A pair of wings 69 outstand from opposite sides of the bottom of the post to facilitate gripping and shifting of the shifting jaw S. A slide slot 70 in the base of each wing 69 adjacent to the sidewall 68 receives the lower undersurface 61 of the guide 58 fitting against the sidewall.

A lip 71 cantilevers from the forward wall of the post forming the release carrier 53 to lie underneath the floor 57 and two spaced rods 72 upstand from this lip to extend through slots 73 in the floor 57. Each pull bolt 65 is formed with a tubular head 74 adapted to fit over a rod 72. The bolt shaft 75 of each pull bolt is extended through the slots 64 of its nest of lock clips 52 and secured thereto by a lock nut 76 with a free fit. These components are so proportioned that movement of the release carrier 53 towards the jaw block 51 engages the nested lock clips 52 with the walls of legs 21, FIG. 11, and movement of the release carrier away from the jaw block 52 releases the nested lock clips from the walls of the legs 21, FIG. 12. To keep the release carrier in a releasing position except when the jaw block engages a workpiece, a spring 77 is mounted between the jaw block 51 and carrier 53 in respective sockets 78 and 79.

The end cap E at the end of the bar opposite to the clamp jaw C need not be described since it is cosmetic and does not contribute to the operation of the guide clamp. It may assume any suitable form which will fit upon the bar and close the cavity 22 at the end of the bar.

Figure 13:
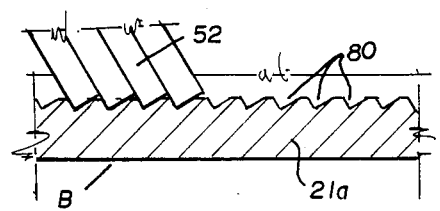
FIG. 13 is a fragmentary portion of the guide clamp bar as taken from the indicated line 13—13 at FIG. 2 but on a greatly enlarged scale and illustrating an alternate construction to more effectively secure the shifting jaw onto the guide clamp bar.

A number of alternates and variations to the features herein described are possible to devise and develop and such need not be described herein. The structure shown at FIG. 13, however, provides for a modification of the bar B which is desired where the guide clamp is to grip a workpiece W with considerable tightness. When the bar B is formed of extruded aluminum and the lock clips 52 of the shifting jaw S are of tempered steel with sharp edges, it is possible that the lock clips will bite into the inner walls of the bar legs 21 deeper than can be tolerated. To avoid such a result, modified bar legs 21a are formed with serrations 80 spaced such that each lock clip 52 will seat upon a serration step as illustrated. Such serrations are easily formed in the bar after it is extruded by pulling a cog-wheel tool through the channel cavity 22. With such serrations the locking of the shifting jaw S is positive in all respects.

Figures 14, 15:
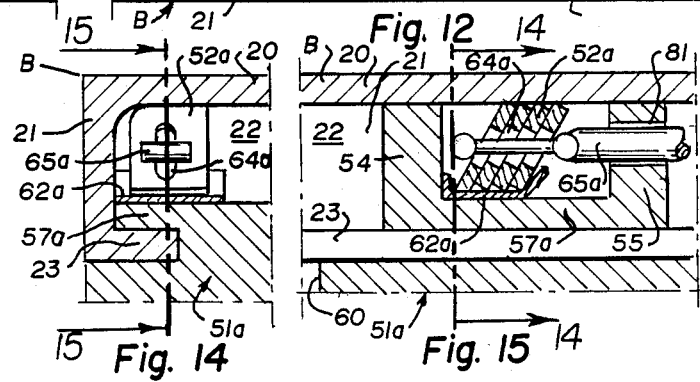

FIGS. 14 and 15 illustrate a modified mode of mounting lock clips 52a of the shifting jaw S in the channel cavity 22 by placing the lock clips 52a upright to engage the underside of the top 20 of the bar B. The jaw block 51a is modified by extending the floor 57a about and above the inturned lip 23 of the bar B. A pad 62a on the floor 57a holds a nest of lock clips 52a to incline upwardly and rearwardly to the underside of top 20. A pull bolt 65a extends horizontally through a passageway 81 in the rear wall 55 to connect with the forward head 66 of the release carrier 53. The pull bolt 65a is shaped to extend through slots 64a of the lock clips 52a to hold these lock clips together and to shift them against and away from the undersurface of the top 20. The other elements of this modified shifting jaw S' are essentially the same as hereinbefore described.

The operation of the improved guide clamp G is apparent from the foregoing description. The guide clamp G is placed upon a workpiece with the clamp jaw at an edge of the workpiece. The shifting jaw is then moved to the opposite edge of the workpiece with sufficient pressure against the wings 69 to push the jaw face 60 against the workpiece and overcome the bias of spring 77. This movement brings the lock clips 52 against the legs 21 to initiate locking of the shifting jaw onto the bar B. Depression of the lever L then moves the clamp jaw against the workpiece to securely lock the guide clamp G onto the workpiece.

I have now described my invention in considerable detail. It is obvious, however, that others skilled in the art can devise and build alternate and equivalent constructions which are within the spirit and scope of my invention. Thus, my protection should be limited, not by the constructions illustrated and described, but only by the proper scope of the appended claims.

I claim:

1. A guide clamp comprising a bar adapted to be placed upon surface of a workpiece and a jaw means having an abutment depending from the bar with a jaw face to engage the edge of the workpiece and wherein:
    (a) the bar is channel-shaped with a top surface and a leg depending from each side thereof to define a cavity between the legs and provide an open undersurface at the base of the legs;
    (b) the jaw means includes a block shiftably mounted within the cavity with the abutment being extended therefrom through the open undersurface; and
    (c) a holding means is associated with the block to hold the jaw means at a selected position on the bar as when the jaw face engages the edge of a workpiece, said holding means including a clamp means carried by said block and being adapted to engage the inner surface of the bar, within the channel cavity, and lock the jaw means to the bar responsive to pressure of the jaw face as against an edge of a workpiece.

2. The guide clamp defined in claim 1, further comprising:
 (a) second jaw means near an end of the bar and second holding means at the end of the bar; and
 (b) an extendable means at the second holding means engaging and holding the second jaw means and being adapted to extend to move the second jaw means away from the end of the bar and towards the center thereof as to tighten the guide clamp onto a workpiece.

3. The guide clamp defined in claim 2, wherein:
 (a) said extendable means includes a cam means engaging said block and being shiftable to move said block; and
 (b) a lever outstanding from the end of the bar adapted to be depressed to shift the cam means.

4. The guide clamp defined in claim 2, including a reaction spring means adapted to urge second the jaw means against the extendable means whereby to permit the second jaw means to move towards the end of the bar as to loosen the guide clamp from a workpiece whenever the extendable means is retracted.

5. The guide clamp defined in claim 1, including:
 (a) a release carrier associated with the jaw means; and
 (b) a connection means connecting the release carrier with the clamp means to normally prevent the clamp means from engaging the inner surface of the bar and locking thereto but to permit the clamp means to initiate locking whenever the jaw face moves against the edge of a workpiece.

6. The guide clamp defined in claim 1, wherein:
 (a) a compartment is formed within said block; and
 (b) said clamp means includes a lock clip means within the compartment, angled with respect to the longitudinal elements of the bar with the end of the lock clip means adjacent to the jaw face being held by said block against a side of the compartment and with the opposite end of the lock clip means being extended to a surface of the bar within the channel cavity and adapted to engage this surface to effect the aforementioned locking of the jaw means to the bar by a wedging action.

7. The guide clamp defined in claim 6, wherein:
 (a) a release carrier is associated with the block;
 (b) a connection means connects the release carrier with the lock clip means whereby movement of the release carrier with respect to the block in one direction shifts the said opposite end of the lock clip means into locking engagement with the channel cavity surface and movement in the opposite direction shifts the said opposite end out of locking engagement; and
 (c) a resilient means normally holds the lock clip means to the out-of-engagement position but yields to the pressure of the jaw face as when it moves against the edge of a workpiece.

8. The guide clamp defined in claim 1, wherein:
 (a) a compartment means is disposed transversely across the block with a boundary wall adjacent to the jaw face;
 (b) said clamp means is a V-shaped arrangement of a lock clip means and is positioned within the compartment means with the apex of the V-shaped lock clip means being adjacent to the center of said boundary wall and with the diverging ends of the lock clip means being extended to the inside walls of the bar legs and with the angle of divergence of the lock clip means being such that pressure at the apex, as imparted by pressure at the jaw face, will cause the ends of the lock clip means to wedge and lock against the inside walls of the bar legs;
 (c) a release carrier means associated with the jaw means and connecting with the lock clip means to hold the diverged ends of the lock clip means out of contact with the inside walls of the bar legs when at a first position away from the jaw means and to urge the ends of the lock clip means to engagement with said inside walls at a second position towards the jaw face; and
 (d) a spring means adapted to normally hold the release carrier means at said first position but to yield to pressure against the jaw face to move the release carrier means to said second position.

9. The guide clamp defined in claim 8, wherein said inside walls of the bar legs are serrated to provide a positive engagement of the diverged ends of the lock clip means therewith.

10. The guide clamp defined in claim 1, wherein:
 (a) a compartment means is disposed transversely across the block with a floor portion and a boundary wall adjacent to the jaw face;
 (b) the clamp means includes a lock clip means, one end of which is positioned at the floor portion adjacent to the boundary wall and with the lock clip means being angled therefrom, with respect to longitudinal elements of the bar, to position the other end of the lock clip means adjacent to the undersurface of the bar top, with the inclination of the lock clip means being such as to wedge against the said undersurface when the lock clip means engages the undersurface to thereby lock the jaw means to the bar;
 (c) a release carrier means associated with the jaw means and connecting with the lock clip means to hold the said other end of the lock clip means out of engagement with said undersurface when at a first position away from the jaw means and to urge said other end to engagement with said undersurface when at a second position towards the jaw face; and
 (d) a spring means adapted to normally hold the release carrier at said first position but to yield to pressure against the jaw face to move the carrier to said second position.

11. A guide clamp comprising a holder means adapted to accept the surface of a workpiece and a jaw means having an abutment projecting from the holder means with a jaw face to engage the edge of the workpiece and wherein:
 (a) the holder means is channel-shaped to define a cavity;
 (b) the jaw means includes a block shiftably mounted within the cavity with the abutment being extended therefrom; and
 (c) a clamp means is associated with the block to hold the jaw means at a selected position on the holder means as when the jaw face engages the edge of a workpiece, said clamp means carried by said block and being adapted to engage the inner surface of the holder means, within the channel cavity, and lock the jaw means to the holder means responsive to pressure of the jaw face as against an edge of a workpiece.

12. The guide clamp defined in claim 11, further comprising:
(a) second jaw means near an end of the holder means and second clamp means at the end of the holder means; and
(b) an extendable means at the second clamp means engaging and holding the second jaw means and being adapted to extend to move the second jaw means away from the end of the holder means and towards the center thereof as to tighten the guide clamp onto a workpiece.

13. The guide clamp defined in claim 12, wherein:
(a) said extendable means includes a cam means engaging said block and being shiftable to move said block; and
(b) a lever outstanding from the end of the holder means adapted to be depressed to shift the cam means.

14. The guide clamp defined in claim 12, including a reaction spring means adapted to urge the second jaw means against the extendable means whereby to permit the second jaw means to move towards the end of the holder means as to loosen the guide clamp from a workpiece whenever the extendable means is retracted.

15. The guide clamp defined in claim 11, including:
(a) a release carrier associated with the jaw means; and
(b) a connection means connecting the release carrier with the clamp means to normally prevent the clamp means from engaging the inner surface of the holder means and locking thereto but to permit the clamp means to initiate locking whenever the jaw face moves against the edge of a workpiece.

16. The guide clamp defined in claim 11, wherein:
(a) a compartment is formed within said block; and
(b) said clamp means includes a lock clip means within the compartment, angled with respect to the longitudinal elements of the holder means with the end of the lock clip means adjacent to the jaw face being held by said block against a side of the compartment and with the opposite end of the lock clip means being extended to a surface of the holder means within the channel cavity and adapted to engage this surface to effect the aforementioned locking of the jaw means to the holder means by a wedging action.

17. The guide clamp defined in claim 16, wherein:
(a) a release carrier is associated with the block;
(b) a connection means connects the release carrier with the lock clip means whereby movement of the release carrier with respect to the block in one direction shifts the said opposite end of the lock clip means into locking engagement with the channel cavity surface and movement in the opposite direction shifts the said opposite end out of locking engagement; and
(c) a resilient means normally holds the lock clip means to the out-of-engagement position but yields to the pressure of the jaw face as when it moves against the edge of a workpiece.

18. The guide clamp defined in claim 11, wherein:
(a) a compartment means is disposed transversely across the block with a boundary wall adjacent to the jaw face;
(b) said clamp means is a V-shaped arrangement of a lock clip means and is positioned within the compartment means with the apex of the V-shaped lock clip means being adjacent to the center of said boundary wall and with the diverging ends of the lock clip means being extended to the inside walls of the channel legs and with the angle of divergence of the lock clip means being such that pressure at the apex, as imparted by pressure at the jaw face, will cause the ends of the lock clip means to wedge and lock against the inside walls of the channel legs;
(c) a release carrier means associated with the jaw means and connecting with the lock clip means to hold the diverged ends of the lock clip means out of contact with the inside walls of the channel legs when at a first position away from the jaw means and to urge the ends of the lock clip means to engagement with said inside walls at a second position towards the jaw face; and
(d) a spring means adapted to normally hold the release carrier means at said first position but to yield to pressure against the jaw face to move the release carrier means to said second position.

19. The guide clamp defined in claim 18, wherein said inside walls of the channel legs are serrated to provide a positive engagement of the diverged ends of the lock clip means therewith.

20. The guide clamp defined in claim 11 wherein:
(a) a compartment means is disposed transversely across the block with a floor portion and a boundary wall adjacent to the jaw face;
(b) the clamp means includes a lock clip means, one end of which is positioned at the floor portion adjacent to the boundary wall and with the lock clip means being angled therefrom, with respect to longitudinal elements of the bar, to position the other end of the lock clip means adjacent to the undersurface of the channel, with the inclination of the lock clip means being such as to wedge against the said undersurface when the lock clip means engages the undersurface to thereby lock the jaw means to the holder means;
(c) a release carrier means associated with the jaw means and connecting with the lock clip means to hold the said other end of the lock clip means out of engagement with said undersurface when at a first position away from the jaw means and to urge said other end to engagement with said undersurface when at a second position towards the jaw face; and
(d) a spring means adapted to normally hold the release carrier at said first position but to yield to pressure against the jaw face to move the carrier to said second position.

* * * * *